United States Patent
Negusse

(10) Patent No.: US 7,301,901 B1
(45) Date of Patent: Nov. 27, 2007

(54) METHOD AND SYSTEM FOR COMMUNICATING VOICE OVER A LOW-SPEED COMMUNICATIONS LINK

(75) Inventor: Isaac Negusse, Reston, VA (US)

(73) Assignee: Sprint Communications Company L.P., Overland Park, KS (US)

(*) Notice: Subject to any disclaimer, the term of this patent is extended or adjusted under 35 U.S.C. 154(b) by 1074 days.

(21) Appl. No.: 10/265,959

(22) Filed: Oct. 7, 2002

(51) Int. Cl.
 *H04L 12/56* (2006.01)
 *G06F 15/16* (2006.01)

(52) U.S. Cl. .................. 370/230; 370/409; 370/471; 370/474; 709/236

(58) Field of Classification Search ............ 370/395.1, 370/473, 237, 466, 229, 352, 394, 230, 409, 370/471, 474; 709/250, 236; 725/105
See application file for complete search history.

(56) References Cited

U.S. PATENT DOCUMENTS

| | | | |
|---|---|---|---|
| 6,208,650 B1* | 3/2001 | Hassell et al. ............. | 370/392 |
| 6,278,708 B1* | 8/2001 | Von Hammerstein et al. ...................... | 370/389 |
| 6,292,495 B1* | 9/2001 | Von Hammerstein et al. ...................... | 370/465 |
| 6,539,011 B1* | 3/2003 | Keenan et al. ............. | 370/352 |
| 6,574,242 B1* | 6/2003 | Keenan et al. ............. | 370/474 |
| 6,671,741 B1* | 12/2003 | Dillon ........................ | 709/250 |
| 6,707,799 B1* | 3/2004 | Chui .......................... | 370/282 |
| 6,845,105 B1* | 1/2005 | Olsson et al. ............... | 370/469 |
| 6,891,832 B1* | 5/2005 | Chien et al. ............ | 370/395.1 |
| 2002/0087716 A1* | 7/2002 | Mustafa .................... | 709/236 |
| 2003/0206559 A1* | 11/2003 | Trachewsky et al. ....... | 370/509 |
| 2005/0246570 A1* | 11/2005 | Block et al. ................ | 714/4 |
| 2006/0130104 A1* | 6/2006 | Budagavi ................... | 725/105 |

OTHER PUBLICATIONS

Tuning Voice Over the WAN, Jan. 22, 2001 By Dave Brown, http://www.networkcomputing.com/1202/1202ws3.html.*
Slow Vid and MTU's, Thu, Oct. 30, 1997 By Ernest Smothers, http://baby.indstate.edu/CU-SeeMe/devl_archives/oct_97/0325.html.*
"Voice over Frame Relay Using FRF.11 and FRF.12" by Cisco IOS found on http://www.cisco.com/univercd/cc/td/doc/product/software/ios120/120newft/120limit/120xg/120xg3/12xgvofr/vofr1.pdf.*
"Problem: MTU size" found on http://www.voiptroubleshooter.com/problems/mtu.html.*
"FRF.12 support on Switched Frame Relay PVCs" found on http://www.cisco.com/en/US/products/sw/iosswrel/ps1834/products_feature_guide09186a0080080039.html.*
"Tuning Voice over the Wan" Jan. 22, 2001.*
"Slow Vid and MTU's" Oct. 30, 1997.*
"Understanding delay in pocket voice networks" by Cisco Mar. 5, 2007 found on http://www.cisco.com/warp/public/788/voip/delay-details.html.*
The Frame Relay Forum PVC User-to Network Interface (UNI) Implementation Agreement FRF 1.2, Copyright (2000) The Frame Relay Forum, Editor: David Sinicrope, Lucent Technologies.

(Continued)

Primary Examiner—Alpus H. Hsu

(57) ABSTRACT

The invention is a method and system for enabling voice communications over a low-speed link where not all components on the link support FRF.12 and where using multiple PVCs is not a desired, or even available, alternative. All consumer premise equipment devices are configured to: enable frame-relay fragmentation, prevent actual fragmentation by setting the fragmentation-size parameter to a value greater than the largest packet passing through the network, and a maximum-transfer-unit setting that compensates for the lack of fragmentation.

44 Claims, 2 Drawing Sheets

OTHER PUBLICATIONS

FRF.1.2 PVC User-to-Network Interface (UNI) Implementation Agreement—Jul. 2000.

FRF.2.2 Frame Relay Network-to-Network Interface (NNI) Implementation Agreement—Mar. 2002.

FRF.3.2 Frame Relay Multiprotocol Encapsulation Implementation Agreement—Apr. 2000.

FRF.4.1 SVC User-to-Network Interface (UNI) Implementation Agreement—Jan. 2000.

FRF.5 Frame Relay/ATM PVC Network Interworking Implementation—Dec. 1994.

FRF.6 Frame Relay Service Customer Network Management Implementation Agreement (MIB)—Mar. 1994.

FRF.6.1 Frame Relay Service Customer Network Management Implementation Agreement—Sep. 2002.

FRF.7 Frame Relay PVC Multicast Service and Protocol Description—Oct. 1994.

FRF.8.1 Frame Relay / ATM PVC Service Interworking Implementation Agreement—Feb. 2000.

FRF.9 Data Compression Over Frame Relay Implementation Agreement—Jan. 1996.

FRF.10.1 Frame Relay Network-to-Network SVC Implementation Agreement—Sep. 1996.

FRF.11.1 Voice over Frame Relay Implementation Agreement—May 1997—Annex J added Mar. 1999.

FRF.12 Frame Relay Fragmentation Implementation Agreement—Dec. 1997.

FRF.13 Service Level Definitions Implementation Agreement—Aug. 1998.

FRF.14 Physical Layer Interface Implementation Agreement—Dec. 1998.

FRF.15 End-to-End Multilink Frame Relay Implementation Agreement—Aug. 1999.

FRF.16.1 Multilink Frame Relay UNI/NNI Implementation Agreement—May 2002.

FRF.17 Frame Relay Privacy Implementation Agreement—Jan. 2000.

FRF.18—Network-to-Network FR/ATM SVC Service Interworking Implementation Agreement—Apr. 2000.

FRF.19 Frame Relay Operations, Administration and Maintenance Implementation Agreement—Mar. 2001.

FRF.20 Frame Relay IP Header Compression Implementation Agreement—Jun. 2001.

\* cited by examiner

METHOD AND SYSTEM FOR COMMUNICATING VOICE OVER A LOW-SPEED COMMUNICATIONS LINK

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention is related to the field of communications. More particularly, the present invention provides a new and useful method for supporting voice transmission over a low-speed communications link in a network that does not support the FRF.12 protocol.

BACKGROUND OF THE INVENTION

Frame-relay networks communicate data in packets. Packet-based networks such as frame-relay and Internet-Protocol (IP) networks are not optimized to transmit voice. Various attempts to support voice over packet-switched networks exist, but not for networks that do not support FRF.12, especially where multiple access Private Virtual Circuits (PVCs) are unavailable. There are many such networks today.

Accordingly, certain multiservice nodes including software-implemented routers and switches made by leading vendors do not support voice over a low-speed communications link because they do not support FRF.12. These multiservice nodes were designed to route IP packets, as well as switch traditional frame relay, but the FRF.12 standard is not supported. An exemplary FRF.12 aspect not supported includes frame-relay reassembly: the reassembly of fragmented frames. Using FRF.12 to accommodate low-speed voice transmissions is desirous.

The Frame Relay Forum (FRF) promulgates implementation agreements, also known as standards. These implementation agreements are numbered and explain certain standards and recommendations for implementing a set of technologies. For example, an implementation agreement related to FRF.12 was written in December 1997 and entitled Frame Relay Fragmentation Implementation Agreement (implementation agreement). This and all other FRF implementation agreements are available from The Frame Relay Forum, Suite 307 at 39355 California Street in Fremont, Calif. 94538.

The shorthand reference to "FRF.12" refers to the FRF.12 protocol, which is described in the FRF.12 implementation agreement and incorporated by reference herein. Accordingly, FRF.12 is a standards-based way of fragmenting frame-relay packets.

Frame-relay networks offer many advantages including a protocol-independent data-transmission system that can communicate packets ("frames") of data of various sizes in virtually any native data protocol. One skilled in the art would appreciate such an advantage. As explained in the 18th edition of Newton's Telecom Dictionary (Newton): an X.25 packet of 128 bytes can be switched and transported over the network just as can an Ethernet frame of 1500 bytes. However, focus for frame relay payloads has turned to IP, usually based on RFC 1490 encapsulation. Although frame-relay networks offer certain advantages, especially as single PVC access to VPN cores, there is not an accepted way to transmit voice across a low-speed link if these networks do not support the FRF.12 protocol. The industry standards prevent it.

Explained in greater detail below, a serialization delay is a window of time to prevent excessive voice-packet latency, or even packet rejection. In the prior art, the serialization delay is prevented from exceeding an accepted value, ten milliseconds, by setting the fragmentation size to a value small enough to achieve that goal. But in networks without FRF.12 support, fragmenting with FRF.12 to the necessary size will prevent any IP payloads from reaching their destination across the VPN. This fragmenting disassociates the IP header of the parent frame from the fragmented frames. The fragmented frames would be lost because the IP header is not duplicated for each frame fragmentation.

Absent the present invention, it has not been possible to accommodate low-speed voice transmission over a VPN with FRF.12 limitations that markets a single PVC logical access method, as many do. Again, many hardware providers' network components, such as virtual routers, do not currently conform to the FRF.12 standard. The current industry-recommended alternative to using FRF.12 to support low-speed voice transmission is to use multiple PVCs.

A PVC is a permanent association between two terminal devices. Newton explains: once the PVC is designed and programmed by a carrier into a network, all data transmitted between any two points across the network follows a predetermined path, making use of a virtual circuit. But many data products do not market such a use of multiple PVCs. Instead, frame relay PVC's are used as access mechanisms to reach a core VPN—giving network subscribers any-to-any connectivity with only one PVC. By implementing a single-PVC-per-site concept, these networks greatly reduce the number of PVCs that would be required to provide any-to-any, point-to-point links. Implementing a multiple-PVC scheme is typically prohibitively complex.

Beyond the complexity, another significant problem with implementing multiple PVCs is that IP networks, in general, do not use multiple PVCs, or layer-2 connections. They use a single layer-2 connection. That is, using multiple PVCs does not offer a low-speed voice-transmission solution in an IP networking (including IP-VPNs) environment. A network-based VPN service has routing and security intelligence built into the network, rather than at the customer's premises. Thus, using multiple PVCs is not a viable option for transmitting voice over a low-speed.

With no industry-recommended way to support low-speed voice, the current state of the art could be improved by providing a way to transmit high-quality, low-speed voice across existing (and future) networks that do not support FRF.12.

SUMMARY OF THE INVENTION

The present invention solves at least the above problems by providing a system and method for enabling high-quality, low-speed voice transmissions across networks that do not support FRF.12. Per the FRF.12 standard, when a frame-relay frame is fragmented, the original frame's IP header is not duplicated. Thus, some fragments will not contain IP addresses. These fragments will not be routed because they do not contain a destination address, which is in the IP header that is not duplicated. Even the first fragment will be useless without the remainder of its contents, which will not traverse these types of networks.

The present invention solves the above problem by configuring Network Interface Devices (NIDs), including Customer Premise Equipment (CPE) components, namely data-routing components such as routers, to enable fragmenting but also to prevent the data packets from being fragmented. Setting the fragmentation size parameter to a value greater than the largest packet passing through the network will prevent actual frame fragmentation but preserve the ability to interleave frames that are leaving the router. Enabling FRF.12 can guarantee the prioritization of voice packets over any competing data traffic. In a preferred embodiment, the FRF.12 fragmentation size is approximately 1500 bytes, though it can be larger or smaller depending on the size of packets traversing the router in question. Whatever that maximum frame relay packet size is—the FRF.12 fragmentation size must be equal or greater. Absent the present invention, however, setting the fragmentation size to so large a value would result in unacceptably long serialization delays.

To compensate for the larger packet sizes and prohibit the serialization delay from exceeding a value that would cause a listener to hear a noticeable disruption from a speaker, the router's MTU parameter is capped at 80 bytes per DS-0, which is 64 kilobits/sec of bandwidth. In a preferred embodiment, the serialization delay is at most ten milliseconds.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

Figure 1:
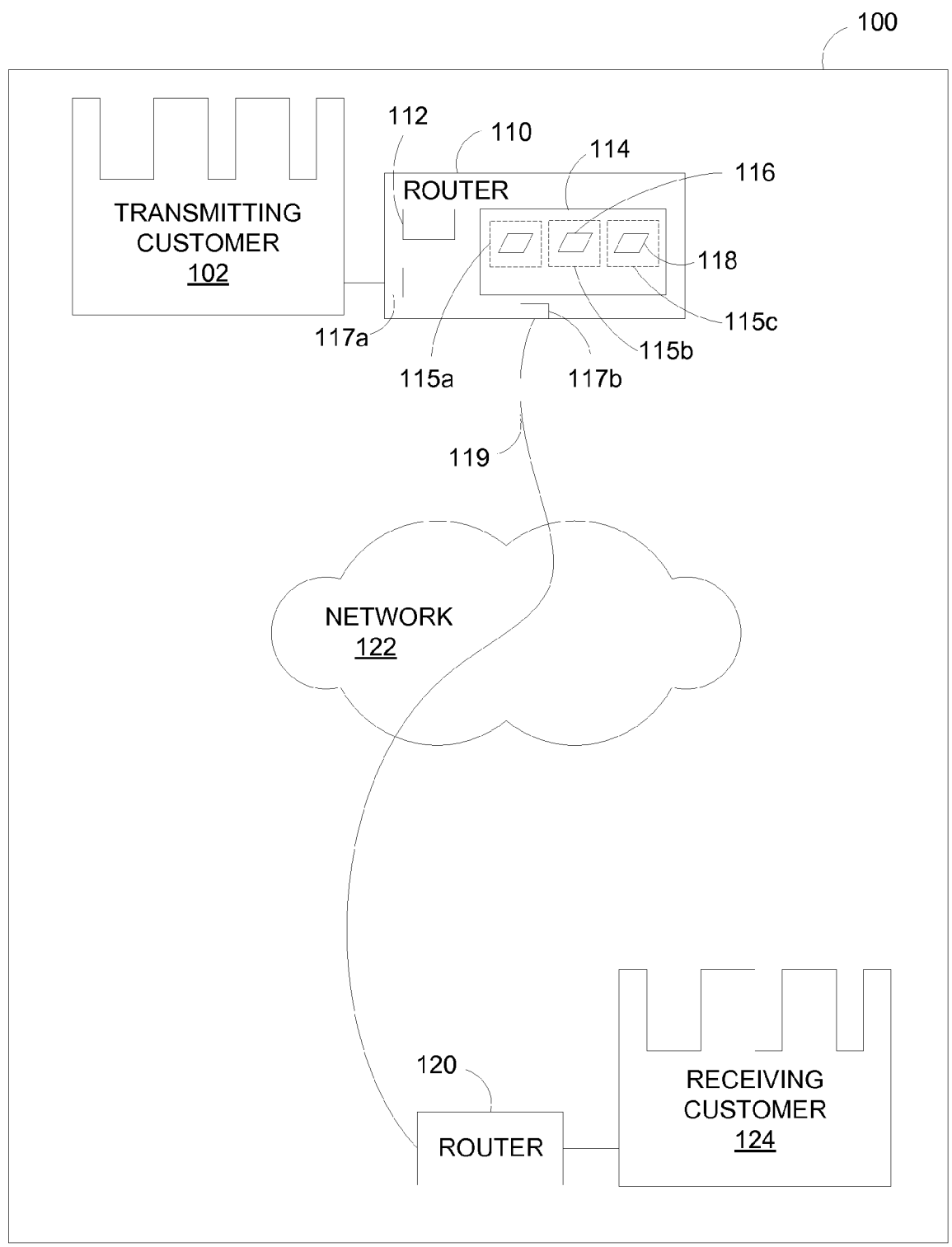
FIG. 1 is a block diagram illustrating exemplary components for implementing the present invention.

The present invention enables high-quality voice transmission over low-speed connections across networks that do not support FRF.12. The present invention strays from the industry norm by setting the fragmentation size to a large value. This large value is large enough to permit packets to pass without being fragmented.

The present invention accomplishes two things that are required to transmit voice over a low-speed packet-based connection: 1) allows for the guaranteed interleaving of packets, which permits guaranteed prioritization, and 2) prevents fragmentation, even though fragmentation is enabled. Sending the frames unfragmented prevents multi-service nodes that do not support the FRF.12 protocol from discarding the packets.

Acronyms and Shorthand Notations

Throughout the disclosure of the present invention, several acronyms and shorthand notations are used to aid in the understanding of certain concepts pertaining to the associated system and services. These acronyms and shorthand notations are solely intended for the purpose of providing an easy methodology of communicating the ideas expressed herein, and are in no way meant to limit the scope of the present invention. The following is a list of these acronyms:

CPE Customer Premise Equipment
FRF.12 Frame Relay Forum 12
IP Internet Protocol
IP-MTU Internet Protocol Maximum Transfer Unit (MTU)
LAN Local Area Network
NID Network-Interface Device
PVC Permanent Virtual Circuit
VPN Virtual Private Network
WAN Wide Area Network Further, various telecom technical terms are used throughout this disclosure. A definition of such terms can be found in: H. Newton, *Newton's Telecom Dictionary*, 18$^{th}$ Updated and Expanded Edition (2002). These definitions are intended to provide a clearer understanding of the ideas disclosed herein but are in no way intended to limit the scope of the present invention. The definitions and terms should be interpreted broadly and liberally to the extent allowed by the art and the meaning of the words offered in the above cited reference.

The present invention will be described more fully with reference to the accompanying figures where exemplary embodiments of the invention are shown. The present invention should not be construed as limited to those embodiments. Rather, the described embodiments are illustrative in nature.

As one skilled in the art will appreciate, the present invention may be embodied as, among other things: a method, a data-communications system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on a computer-readable medium.

Computer-readable media include both volatile and nonvolatile media, removable and nonremovable media and contemplates media readable by a database, a switch, and various other network devices. Network switches, routers, and related components are conventional in nature; as is a means of communicating with the same. By way of example, and not limitation, computer-readable media may comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to: RAM, ROM, EEPROM, flash memory or other memory technology, CD-ROM, digital versatile disks (DVD), holographic media or other optical disk storage, magnetic cassettes, magnetic tape, magnetic disk storage, and other magnetic storage devices. Machine-readable media includes media that contains instructions that can be interpreted and processed by a NID.

Communications media typically embody computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communication media include: wired media, such as a wired network or direct-wired connection, and wireless media such as acoustic, infrared, radio, microwave, spread-spectrum, and other wireless media technologies. Combinations of the above are included within the scope of computer-readable media.

Low-Speed, Voice-Transmission System

The present invention may be implemented using a variety of Network Interface Devices (NID). A NID is any device in a network that interfaces between one or more data connections and is not intended to narrowly refer to an electronic device that connects a telephone line to a local loop. A CPE devices is a type of NID. A router is a communications network device that is conventional in nature and well known in the art. Routers provide, among other things, an interface between two networks. Routers can be implemented in software or hardware. Components of the router may include, but are not limited to: input/output devices, a display, a processing unit, internal system memory, as well as a suitable system bus for coupling together the various internal system components; for connecting these components to external devices. These individual components and subcomponents are not shown because of their conventional nature.

FIG. 1 shows the components of a system 100 used to provide high-quality voice transfer over a low-speed communications link. A transmitting customer 102 is coupled to a first router 110. As mentioned above, the router may include a processor 112 and an internal system memory 114. Internal system memory 114 may include software modules shown as 115a, 115b, and 115c. Software modules 115a, 115b and 115c are shown with dashed lines to denote that the virtual boundaries of exemplary software modules are outside of the scope of the embodiments of the present invention. An exemplary software parameter is shown in module 115a without numbering. However, module 115b is shown with a frame relay fragmentation-size parameter 116 and module 115c includes an IP-MTU (MTU) parameter 118. Again, the boundaries of software modules are merely exemplary and it should be noted that frame relay fragmentation-size parameter 116 and IP-MTU parameter 118 may reside in the same software module. Similarly, there may be any other number of software modules and parameters present in router 110. Router 110 also includes input/output ports and components 117a and 117b, which again are known in the art. Router 110 is coupled to a second router 120 via a link 119. Link 119 passes through a network 122, which can be the Internet, an Internet-based public VPN, a private VPN, an MPLS-based IP-VPN, an IP WAN, etc. Second router 120 is similar to first router 110 in that it also has numerous components in addition to a fragmentation-size parameter and an MTU parameter, none of which are shown or numbered for clarity. Second router 120 is coupled with a receiving customer 124. For purposes of this example, link 119 is a low-speed communications link, below about 1024 kilobits/sec.

As previously mentioned, the current state of the art contemplates two ways of communicating a voice stream over a low-speed link, such as link 119: using multiple PVCs or using FRF.12-supported networks. Using multiple PVCs is becoming less of an option and many networks have components that do not support the FRF.12 standard. Thus, the present invention can be implemented in at least those situations where voice is to be transmitted via frame-relay where multiple PVCs will not be used and some network components do not support FRF.12.

A network does not support the FRF.12 standard if it cannot satisfy the standards set forth in the FRF.12 implementation agreement. One major element of functionality commonly not supported is the reassembling of fragmented frames. FRF.12 fragmenting is a layer-2 fragmentation. Fragmentation offers certain advantages in some scenarios, but it also has negative consequences not limited to decreasing the efficiency of data transfer.

Fragmenting frames requires the frame header (not the IP header) to be reproduced for each fragmented frame. Appending the reproduced frame header to each fragment creates additional data that must be communicated through the network 122. Sending this greater amount of data requires additional resources and takes longer than sending an unfragmented packet. Accordingly, fragmenting is sometimes disabled in CPE devices, such as routers 110 and 120. But even in the cases where fragmentation is permitted, the fragmentation size may not permit voice packets to properly pass through because of unfragmented simultaneous data transfers.

Moreover, disabling fragmentation prohibits interleaving, which is a way to prioritize data. Data prioritization is important when sending voice transmissions because packets carrying voice should be given a higher priority than other types of data being communicated. Thus, interleaving is beneficial in sending voice transmissions in the midst of other data communications. The present invention does not disable fragmenting. Rather, fragmenting is enabled on both routers 110 and 120. But the fragmentation-size parameter 116 is set to a value high enough to prevent fragmenting. As mentioned earlier, fragmenting frames is a layer-2 fragmentation. Enabling fragmentation permits packet interleaving and guaranteed voice prioritization.

In a preferred embodiment, the fragmentation-size parameter 116 is greater than 1500 bytes. This preferred size is due to the fact that much of the traffic across network 122 is Ethernet traffic. Ethernet packets are normally not larger that 1500 bytes. Accordingly, the fragmentation-size parameter 116 is set to a value greater than 1500 bytes. Most routers can be configured to permit packets up to 1600 bytes. Permitting full packets to pass through link 119 unfragmented could create unacceptably long serialization delays. What is important is configuring the maximum-fragmentation-size parameter 116 to a value that is greater than packets passing through the network. It is understood that the size of the maximum-fragmentation-size parameter 116 is set to a value to allow for packet-header information. Usually only a few bytes, packet-header information includes protocol control information located at the beginning of a protocol data unit. It guides the message to the correct destination. Exemplary packet-header information includes the address information precedence level, routing instructions, and synchronization pulses.

Serialization delay refers to the delay experienced by data that is waiting for data ahead of it to be processed. This delay is directly proportional to packet size. Excessive serialization delay will result in poor quality voice transmission. If a serialization delay of fifty milliseconds is implemented, a voice packet will wait a maximum of fifty milliseconds to be transmitted out of a queue, due to the transmission of another packet that has a length, or size, that causes 50 ms of serialization delay. To preserve the applicability of the present invention to delay-sensitive applications, the serialization delay is preferably capped at ten milliseconds. A serialization delay greater than ten milliseconds may begin to cause a receiving customer 124 to hear gaps in a conversation with transmitting customer 102.

To preserve a ten-millisecond maximum serialization delay, the MTU parameter 118 is set to a value that will ensure a ten-millisecond serialization delay. Having enabled fragmentation on routers 110 and 124, and set the corresponding fragmentation-size parameter to at least 1500 bytes, the MTU parameter 118 is set according the bandwidth of link 119.

Bandwidth is the size of a communications channel, such as link 119, and is typically measured in bits per second. A DS-0 (Digital Signal, level zero) is a voice-grade channel of sixty-four kilobits per second (64 kbs). The MTU parameter 118 is set in bytes. In a preferred embodiment, the MTU parameter 118 is set to eighty bytes per DS-0. Thus, for a 512 kbs link the MTU parameter 118 would be set to 640 bytes because a 512 kbs link is comprised of eight DS-0s. Eighty bytes times eight DS-0s yields 640 bytes. Accordingly, one formula that can be used to determine the MTU setting is:

$$MTU = LinkSpeed * (80 \text{ bytes}/64 \text{ kbs}) \qquad (1)$$

Preferably, six more bytes are removed to account for the frame-relay header and checksum to arrive at a final MTU of 634 bytes for a 512 kbs link.

An alternative formula for setting the maximum value of the MTU parameter 118 (in bytes) is set forth in terms of the maximum, desired serialization delay:

$$MTU = \frac{(\text{Max Serilization Delay} * \text{Link Speed})}{8} \qquad (2)$$

Per equation (2), a maximum serialization delay is chosen (in milliseconds). This delay is multiplied times the speed of the communications link (in bits per second) and then divided by eight. Accordingly, to implement a ten millisecond delay over a 512 kbs link, one would arrive at: 10*512/8=640 bytes. As previously mentioned, this result is preferably reduced to account for the frame-relay header and checksum, customarily four and two bytes respectively. Capping the MTU parameter 118 compensates for the lack of layer-2 fragmenting (although fragmenting is enabled).

Figure 2:
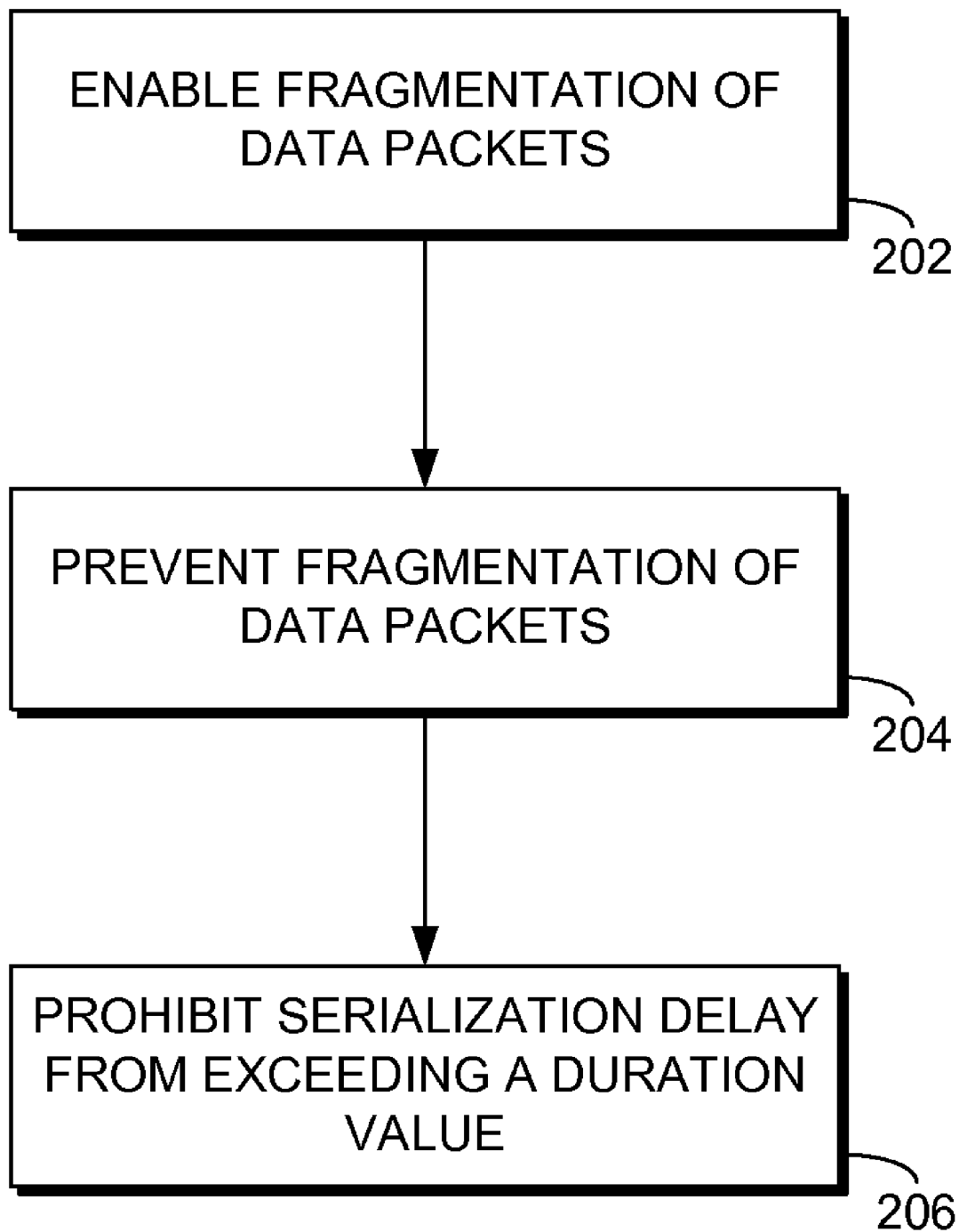
FIG. 2 is a flow diagram of a method to transmit voice over a low-speed link according to claimed embodiments of the present invention.

Enabling fragmentation on the network-interface devices (which include CPE devices) permits interleaving by enabling certain queuing mechanisms. This is shown as step 202 in FIG. 2. This advantageously allows voice packets to be prioritized higher than data packets and is complemented by conventional packet prioritization techniques. The fragmentation-size parameter is set to a value that permits voice packets to pass through the CPE devices unfragmented. This is shown in FIG. 2 as step 204. Finally, corresponding to the step shown as prohibiting a serialization delay 206, the MTU parameter is set to compensate for any delays resulting from sending larger packets.

As can be seen, the present invention and its equivalents are well adapted to enabling high-quality voice communications over a low-speed link where not all components on the link support FRF.12 and where using multiple PVCs is not a desired alternative. Many different arrangements of the various components depicted, as well as components not shown, are possible without departing from the spirit and scope of the present invention.

The present invention has been described in relation to particular embodiments which are intended in all respects to be illustrative rather than restrictive. Alternative embodiments will become apparent to those skilled in the art that do not depart from its scope. The present invention is preferably used in conjunction with other established voice packet prioritization schemes.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for providing low-speed voice transmission utilizing a single Permanent Virtual Circuit (PVC) over a network that communicates data packets, wherein the network does not support FRF.12 and wherein utilizing multiple PVCs is not advantageous, the method comprising:
    enabling the potential for fragmentation of data packets according to a set of one or more network configuration parameters so that the data packets may be interleaved;
    preventing the data packets from actually being fragmented during transmission over the network according to a second set of one or more network configuration parameters so that re-assembly capability is unnecessary; and
    prohibiting a serialization delay from exceeding a duration value that would cause a receiving listener to hear a noticeable disruption from a transmitting speaker.

2. The method of claim 1, wherein preventing said data packets from being fragmented includes configuring a maximum-fragmentation-size parameter of a plurality of interface devices on the network to a setting greater than or equal to the largest packet to pass through said interface devices.

3. The method of claim 2, wherein the maximum-fragmentation-size parameter is adjusted in size to include packet-header information.

4. The method of claim 3, wherein the maximum-fragmentation-size parameter is at least 1500 bytes.

5. The method of claim 2, wherein prohibiting the serialization delay from exceeding said duration value includes configuring a Maximum Transmission Unit (MTU) value of said interface devices to a size that limits said serialization delay.

6. The method of claim 5, wherein configuring the MTU value includes setting it to a maximum value of 80 bytes per 64 kilobits/sec of bandwidth.

7. The method of claim 5, wherein configuring the MTU value includes setting it to a maximum value of one eighth a desired maximum serialization delay times the speed of the transmission link: (Desired Maximum Serialization Delay*Link Speed)/8.

8. The method of claim 7, wherein the desired maximum serialization delay is at most fifty milliseconds.

9. The method of claim 8, wherein the desired maximum serialization delay is at most ten milliseconds.

10. A method for providing voice transmissions over a low-speed link to a Virtual Private Network (VPN) connection comprising performing the steps of the method recited in claim 1 utilizing a network routing device.

11. A method for enabling high-quality, low-speed voice transmission utilizing a single Permanent Virtual Circuit (PVC) on a communications network having network-interface devices that do not support FRF.12, wherein it is advantageous to avoid utilizing multiple PVCs, the method comprising:
    enabling fragmentation on said network-interface devices;
    configuring a fragmentation-size parameter of said network-interface devices that do not support FRF.12 to a value large enough to prevent data packets passing through said communications network from being fragmented; and
    configuring a Maximum Transmission Unit (MTU) to a value at least one eighth a desired maximum serialization delay times the speed of the transmission link: (Desired Maximum Serialization Delay*Link Speed)/8.

12. The method of claim 11, wherein preventing said data packets from being fragmented includes configuring a maximum-fragmentation-size parameter said network-interface devices to a setting greater than or equal to the largest packet to pass through said network-interface devices.

13. The method of claim 12, wherein the maximum-fragmentation-size parameter is adjusted in size to include packet-header information.

14. The method of claim 13, wherein the fragmentation-size parameter is at least 1500 bytes.

15. The method of claim 14, wherein the desired maximum serialization delay is at most fifty milliseconds.

16. The method of claim 14, wherein the desired maximum serialization delay is at most ten milliseconds.

17. The method of claim 16, wherein said communications network relies on a single frame-relay-access Permanent Virtual Circuit (PVC).

18. The method of claim 17, wherein at least one of the said network-interface devices includes a CPE device.

19. The method of claim 18, wherein said CPE device includes a data-routing component.

20. A method for providing a voice transmission over a low-speed network connection comprising performing the steps of the method recited in claim 11 utilizing a CPE data-routing component.

21. A method for enabling Voice over IP over Frame Relay utilizing a single Permanent Virtual Circuit (PVC) over a communications network that has components that do not support FRF.12, wherein use of multiple PVCs is undesirable, the method comprising:
  configuring a fragmentation-size parameter of the network components to a setting large enough to prevent data packets passing through the components from being fragmented; and
  configuring a Maximum-Transmission-Unit (MTU) parameter to a value at least one eighth a desired maximum serialization delay times the speed of the transmission link: (Desired Maximum Serialization Delay*Link Speed)/8.

22. The method of claim 21, wherein configuring a fragmentation-size parameter includes setting said fragmentation-size parameter to a value greater than or equal to the largest packet to pass through said network components.

23. The method of claim 22, wherein the maximum-fragmentation-size parameter is adjusted in size to include packet-header information.

24. The method of claim 22, wherein the fragmentation-size parameter is at least 1500 bytes.

25. The method of claim 22, wherein the desired maximum serialization delay is at most fifty milliseconds.

26. The method of claim 24, wherein the desired maximum serialization delay is at most ten milliseconds.

27. A method for enabling voice to be communicated over a low-speed network utilizing a single Permanent Virtual Circuit (PVC) on a packet-based network that has devices that are not compliant with the FRF.12 protocol, wherein utilizing multiple PVCs is not desired, the method comprising:
  enabling fragmentation on said devices; and
  manipulating a fragmentation-size parameter and an Internet Protocol Maximum Transfer Unit (MTU) parameter associated with each of the devices so that voice packets communicated through the devices are not fragmented and a serialization delay associated with receiving said voice packets does not exceed twenty milliseconds.

28. A computer-readable medium having computer-executable instructions embodied thereon for causing a Network-Interface Device (NID) to perform a method for enabling low-speed, voice transmission utilizing a single frame-relay-access Permanent Virtual Circuit (PVC) in connection with said NID, wherein said NID is coupled to a network that does not support FRF.12 and wherein further it is detrimental to utilize multiple PVCs, the method comprising the steps of:
  configuring a fragmentation-size parameter of said NID to a value large enough to prevent data packets passing through said NID from being fragmented; and
  configuring a Maximum Transmission Unit (MTU) to a value at least one eighth a desired maximum serialization delay times the speed of the transmission link: (Desired Maximum Serialization Delay*Link Speed)/8.

29. The computer-readable medium of claim 28, wherein said NID includes a data-routing component.

30. The computer-readable medium of claim 29, wherein configuring a fragmentation-size parameter includes setting said fragmentation-size parameter to a value greater than or equal to the largest packet to pass through said NID.

31. The computer-readable medium of claim 28, wherein the fragmentation-size parameter is approximately 1500 bytes.

32. The computer-readable medium of claim 28, wherein the desired maximum serialization delay is at most fifty milliseconds.

33. The computer-readable medium of claim 28, wherein the maximum desired serialization delay is at most ten milliseconds.

34. A computer-readable medium having computer-executable instructions embodied thereon for providing voice transmissions over a low-speed Virtual Private Network (VPN) connection comprising utilizing a data-routing component to perform the steps of claim 28.

35. A system for enabling low-speed, voice transmission utilizing a single frame-relay-access Permanent Virtual Circuit (PVC) over a network that does not support FRF.12, wherein the network communicates data packets and wherein utilizing multiple PVCs is not feasible, the system comprising:
  a first signal-routing component that is configured with a set of one or more network configuration parameters permitting the possibility of fragmentation of data packets but prevents the data packets from being fragmented during transmission according to a second set of one or more network configuration parameters; and
  a second signal-routing routing component logically coupled with said first signal-routing component, wherein said second signal-routing component prohibits a serialization delay from exceeding a duration value that would cause a receiving listener to hear a noticeable disruption from a transmitting speaker.

36. The system of claim 35, wherein said first signal-routing component includes a router.

37. The system of claim 36, wherein said router includes a maximum-fragmentation-size parameter.

38. The system of claim 37, wherein the maximum-fragmentation-size parameter is greater than or equal to the largest packet to pass through said communications network.

39. The system of claim 38, wherein the maximum-fragmentation-size parameter is adjusted to include packet-header information.

40. The system of claim 39, wherein said maximum-fragmentation-size parameter is at least 1500 bytes.

41. The system of claim 38, wherein said router includes an Internet Protocol Maximum Transmission Unit (MTU) parameter.

42. The system of claim 41, wherein the IP-MTU parameter has a maximum value of one eighth a desired maximum serialization delay times the speed of the transmission link: (Desired Maximum Serialization Delay*Link Speed)/8.

43. The system of claim 42, wherein the desired maximum serialization delay is at most fifty milliseconds.

44. The system of claim 42, wherein the desired maximum serialization delay is at most ten milliseconds.

* * * * *